US012795705B2

(12) United States Patent
Tsai et al.

(10) Patent No.: US 12,795,705 B2
(45) Date of Patent: Nov. 10, 2026

(54) TECHNIQUES OF PROVIDING DIVERSITY GAIN VIA DEVICE AGGREGATION—CONTROL INFORMATION

(71) Applicant: MEDIATEK INC., Hsinchu (TW)

(72) Inventors: Lung-Sheng Tsai, Hsinchu (TW); Chun-Hao Fang, Hsinchu (TW); Wei-Kai Chang, Hsinchu (TW); Chia-Hao Yu, Hsinchu (TW); Pei-Kai Liao, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 299 days.

(21) Appl. No.: 18/512,295

(22) Filed: Nov. 17, 2023

(65) Prior Publication Data

US 2024/0172258 A1 May 23, 2024

Related U.S. Application Data

(60) Provisional application No. 63/384,610, filed on Nov. 22, 2022.

(51) Int. Cl.

*H04W 72/51* (2023.01)
*H04W 72/0446* (2023.01)
*H04W 72/0453* (2023.01)
*H04W 72/232* (2023.01)

(52) U.S. Cl.

CPC ....... *H04W 72/51* (2023.01); *H04W 72/0446* (2013.01); *H04W 72/0453* (2013.01); *H04W 72/232* (2023.01)

(58) Field of Classification Search

CPC .. H04B 7/0626; H04B 7/0684; H04B 7/0695; H04B 7/06952; H04B 7/0696; H04B 7/06962; H04W 72/0446; H04W 72/0453; H04W 72/23; H04W 72/51; H04W 64/003; H04W 72/232; H04W 76/14

See application file for complete search history.

(56) References Cited

U.S. PATENT DOCUMENTS

| | | | | |
|---|---|---|---|---|
| 2011/0122807 A1* | 5/2011 | Onodera | H04L 25/24 370/315 |
| 2021/0127368 A1* | 4/2021 | Abedini | H04L 5/0053 |
| 2021/0185632 A1* | 6/2021 | Manolakos | H04W 64/003 |
| 2022/0264321 A1* | 8/2022 | Huang | H04W 72/23 |
| 2023/0170962 A1* | 6/2023 | Ali | H04B 7/0626 370/252 |

(Continued)

*Primary Examiner* — Michael Thier
*Assistant Examiner* — Prince A Mensah
(74) *Attorney, Agent, or Firm* — Troutman Pepper Locke LLP; Tim Tingkang Xia, Esq.

(57) ABSTRACT

A first wireless device reports to a base station at least one of (a) a capability of the first wireless device for path selection or path combining and (b) a supported frequency range on the second time-frequency resource. The first wireless device receives, from the base station, first control information indicating whether the first wireless device should receive data on the first time-frequency resource from the base station, on the second time-frequency resource from the second device, or both the first and second time-frequency resources, wherein the data are transmitted from the base station on the first time-frequency resource. The first wireless device receives the data based on the first control information.

20 Claims, 11 Drawing Sheets

(56) References Cited

U.S. PATENT DOCUMENTS

| | | | | |
|---|---|---|---|---|
| 2023/0262482 | A1* | 8/2023 | Liu | H04B 7/06952 370/329 |
| 2024/0098815 | A1* | 3/2024 | Freda | H04W 76/14 |
| 2024/0356626 | A1* | 10/2024 | Jiang | H04W 52/14 |
| 2025/0088259 | A1* | 3/2025 | Jiang | H04B 7/15528 |

* cited by examiner

TECHNIQUES OF PROVIDING DIVERSITY GAIN VIA DEVICE AGGREGATION—CONTROL INFORMATION

CROSS-REFERENCE TO RELATED APPLICATION(S)

This application claims the benefits of U.S. Provisional Application Ser. No. 63/384,610, entitled "SYSTEM ARCHITECTURE FOR DEVICE COLLABORATIVE RX/TX FOR DIVERSITY AGGREGATION" and filed on Nov. 22, 2022, which is expressly incorporated by reference herein in its entirety.

BACKGROUND

Field

The present disclosure relates generally to communication systems, and more particularly, to techniques of providing diversity gain via device aggregation.

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G Nesw Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a first wireless device. The first wireless device reports to a base station at least one of (a) a capability of the first wireless device for path selection or path combining and (b) a supported frequency range on the second time-frequency resource. The capability of path selection requires the first wireless device to receive data either on a first time-frequency resource from the base station or on a second time-frequency resource from a second device, and wherein the capability of path combining requires the first wireless device to receive data on both the first and second time-frequency resources. The first wireless device receives, from the base station, first control information indicating whether the first wireless device should receive data on the first time-frequency resource from the base station, on the second time-frequency resource from the second device, or both the first and second time-frequency resources, wherein the data are transmitted from the base station on the first time-frequency resource. The first wireless device receives the data based on the first control information.

In another aspect of the disclosure, a method, a computer-readable medium, and an apparatus are provided. The apparatus may be a second wireless device. The second wireless device receives second control information to be applied to the second wireless device. The second control information includes at least one of: power control information; transmit and/or receive beamforming information; frequency translation enabling/disabling indicator; resource mapping information for the mapping between the first time-frequency resource and the second time-frequency resource; number of maximal allowable spatial layers for forwarding; and reference signal configuration information. The second wireless device receives a first signal transmitted from a base station on a first time-frequency resource based on the second control information. The second wireless device performs a linear transformation of the first signal to generate a second signal. The second wireless device transmits the second signal on a second time-frequency resource based on the second control information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
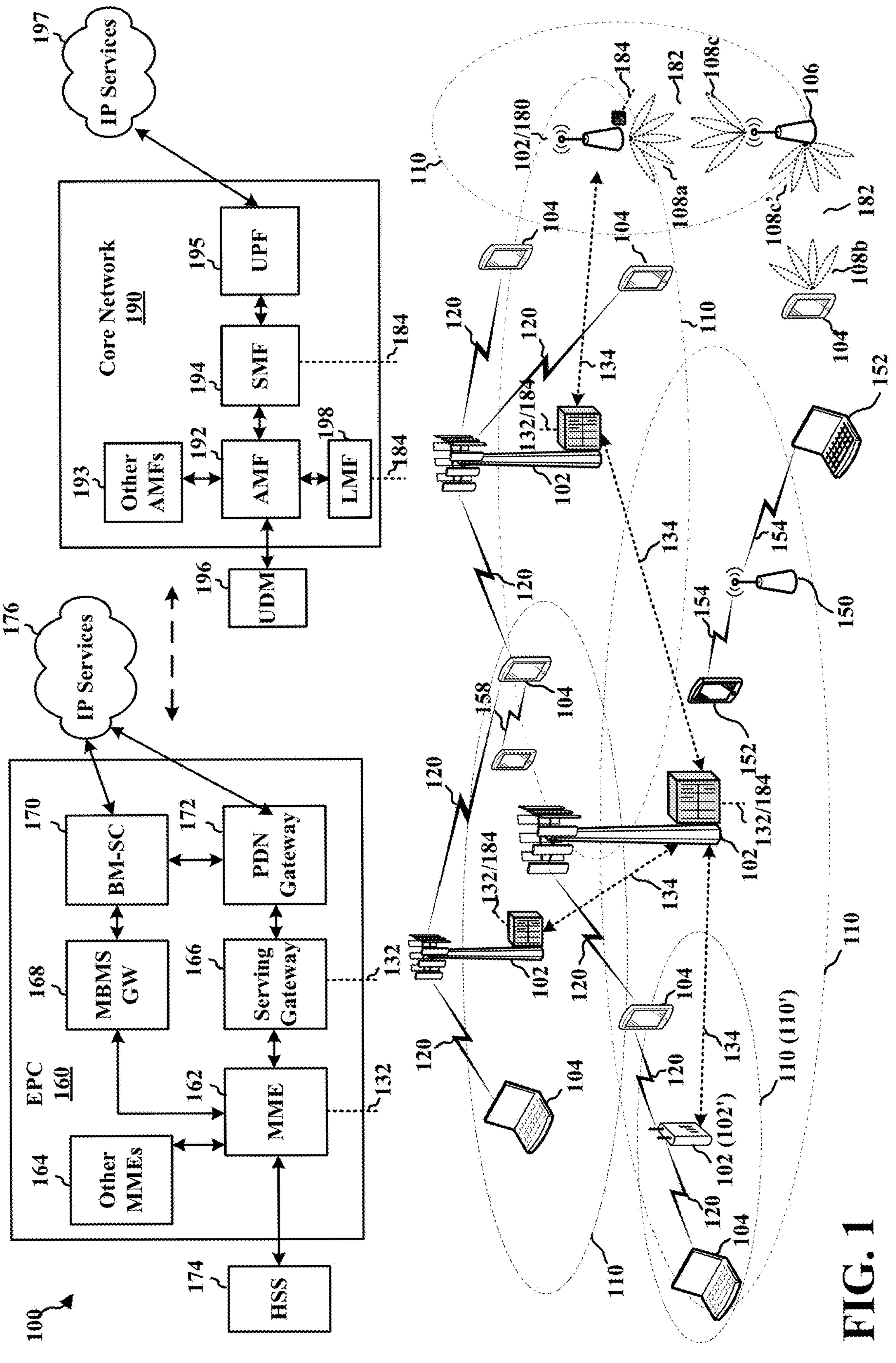
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and a core network 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the core network 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the core network 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 1 10. For example, the small cell 102' may have a coverage area 110' that overlaps the coverage area 1 10 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHZ unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The core network 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the core network 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the core network 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
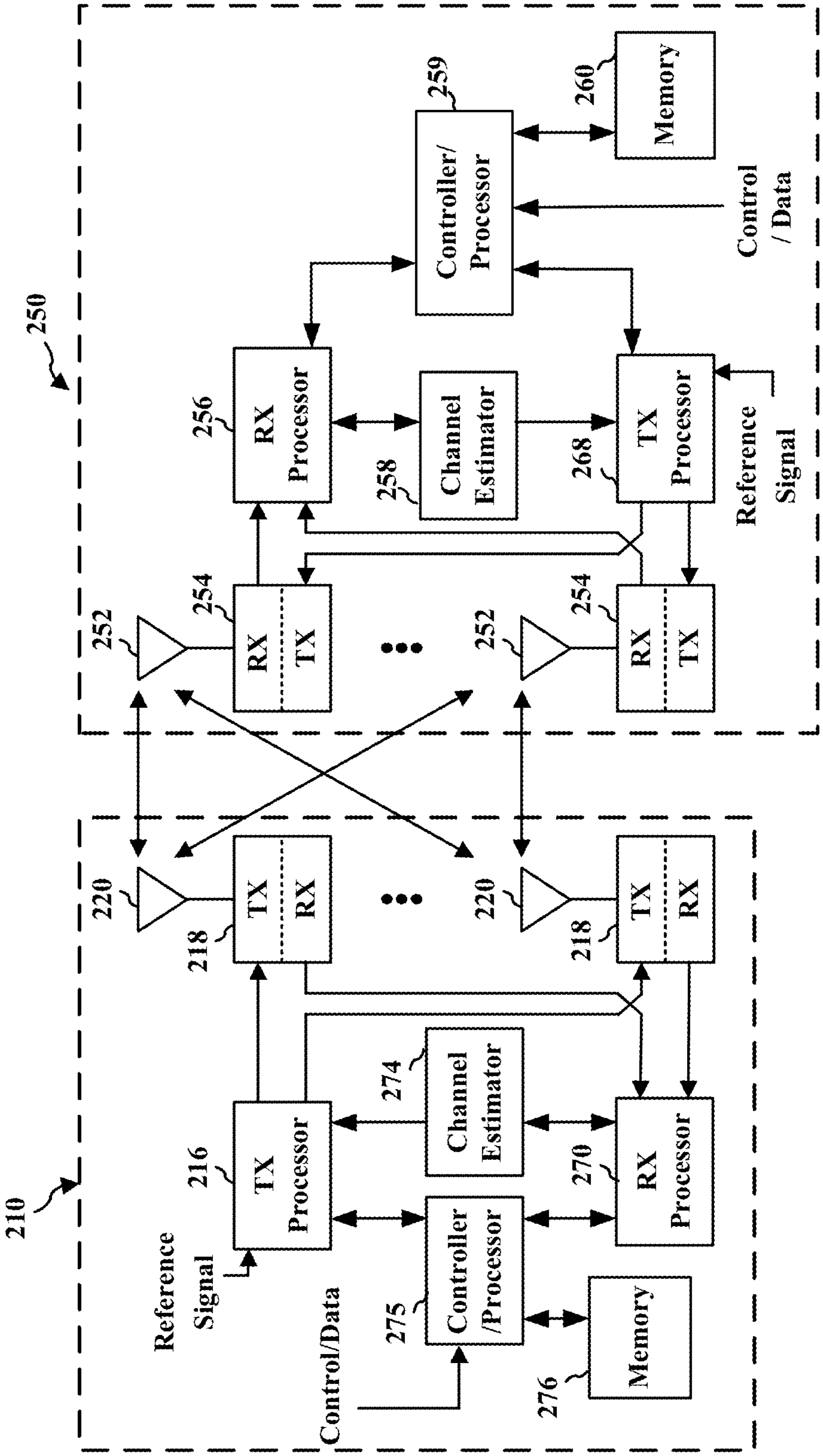
FIG. 2 is a diagram illustrating a base station in communication with a UE in an access network.

FIG. 2 is a block diagram of a base station 210 in communication with a UE 250 in an access network. In the DL, IP packets from the core network 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270) implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the core network 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the core network 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHZ may be supported. In one example, NR resource blocks (RBs) may span 12 sub-carriers with a sub-carrier bandwidth of 60 kHz over a 0.125 ms duration or a bandwidth of 15 kHz over a 0.5 ms duration. Each radio frame may consist of 20 or 80 subframes (or NR slots) with a length of 10 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
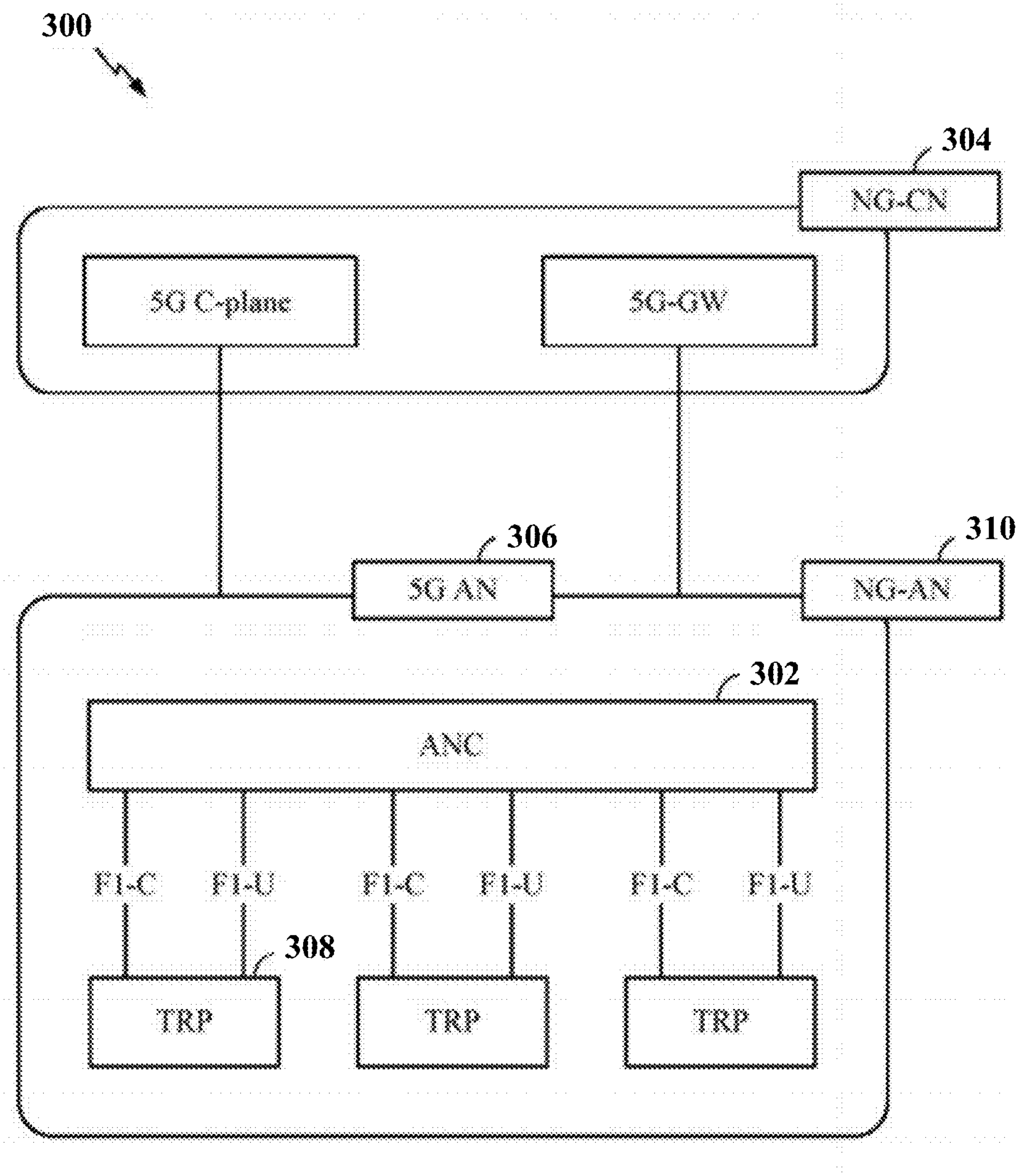
FIG. 3 illustrates an example logical architecture of a distributed access network.

FIG. 3 illustrates an example logical architecture 300 of a distributed RAN, according to aspects of the present disclosure. A 5G access node 306 may include an access node controller (ANC) 302. The ANC may be a central unit (CU) of the distributed RAN 300. The backhaul interface to the next generation core network (NG-CN) 304 may terminate at the ANC. The backhaul interface to neighboring next generation access nodes (NG-ANs) may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
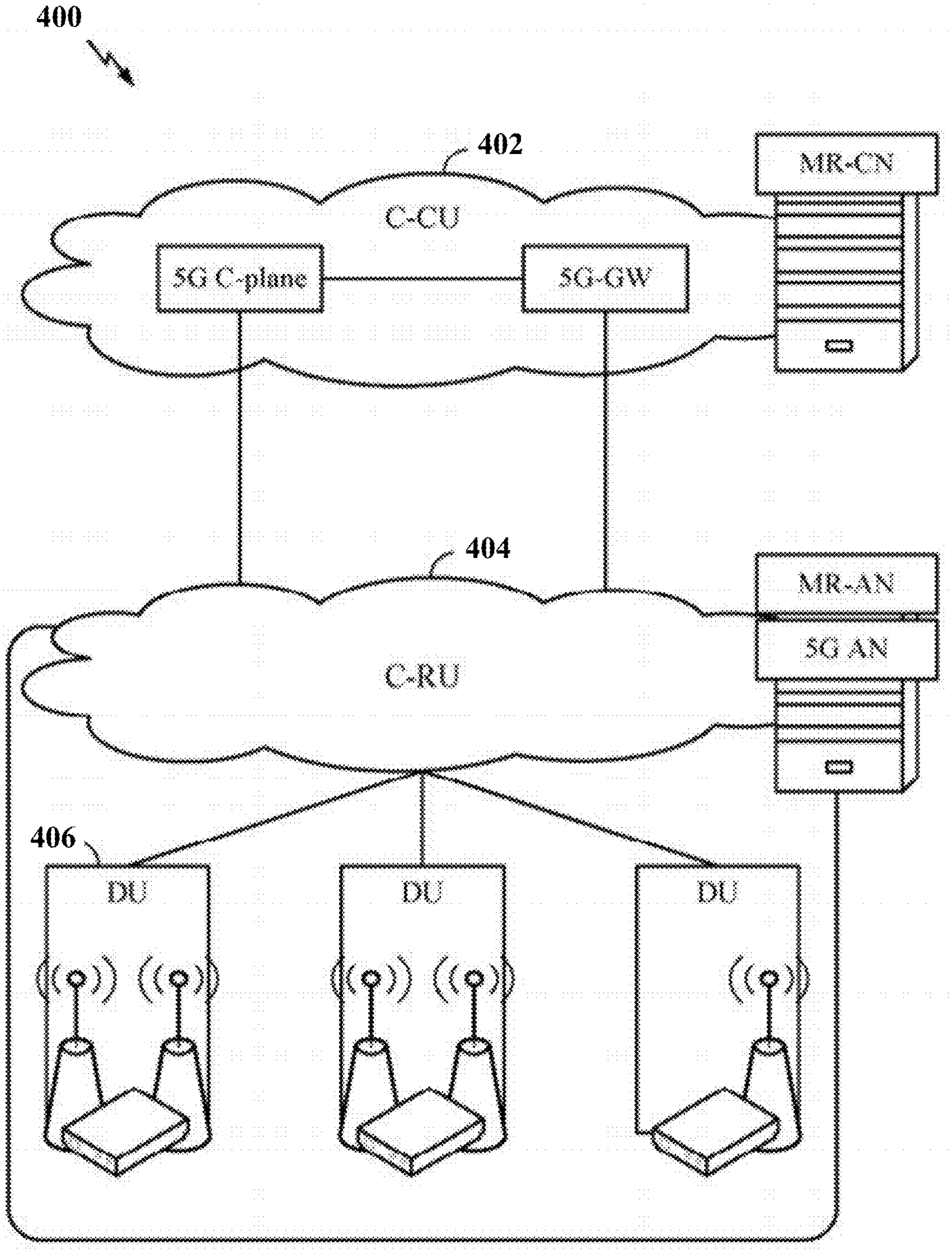
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
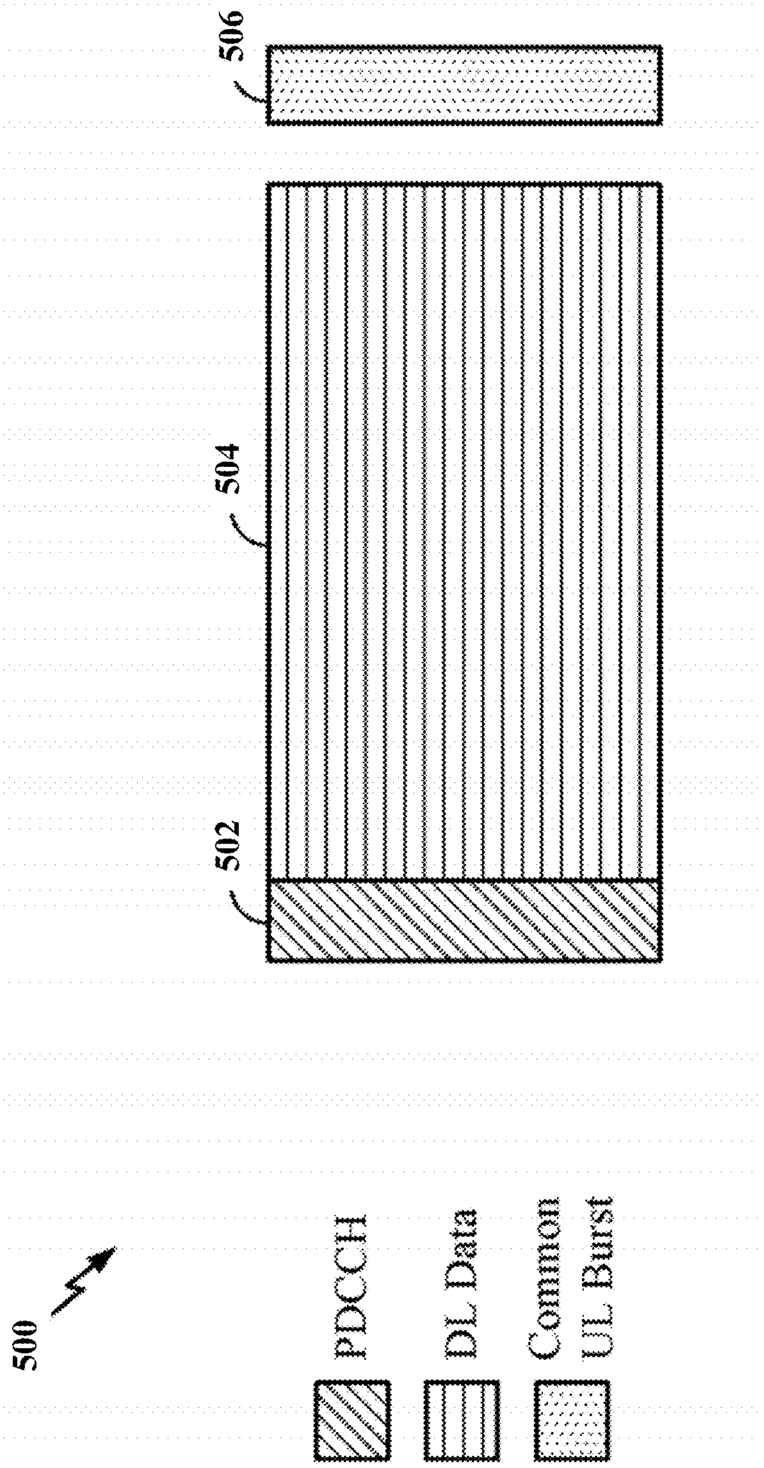
FIG. 5 is a diagram showing an example of a DL-centric subframe.

FIG. 5 is a diagram 500 showing an example of a DL-centric subframe. The DL-centric subframe may include a control portion 502. The control portion 502 may exist in the initial or beginning portion of the DL-centric subframe. The control portion 502 may include various scheduling information and/or control information corresponding to various portions of the DL-centric subframe. In some configurations, the control portion 502 may be a physical DL control channel (PDCCH), as indicated in FIG. 5. The DL-centric subframe may also include a DL data portion 504. The DL data portion 504 may sometimes be referred to as the payload of the DL-centric subframe. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric subframe may also include a common UL portion 506. The common UL portion 506 may sometimes be referred to as an UL burst, a common UL burst, and/or various other suitable terms. The common UL portion 506 may include feedback information corresponding to various other portions of the DL-centric subframe. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 6:
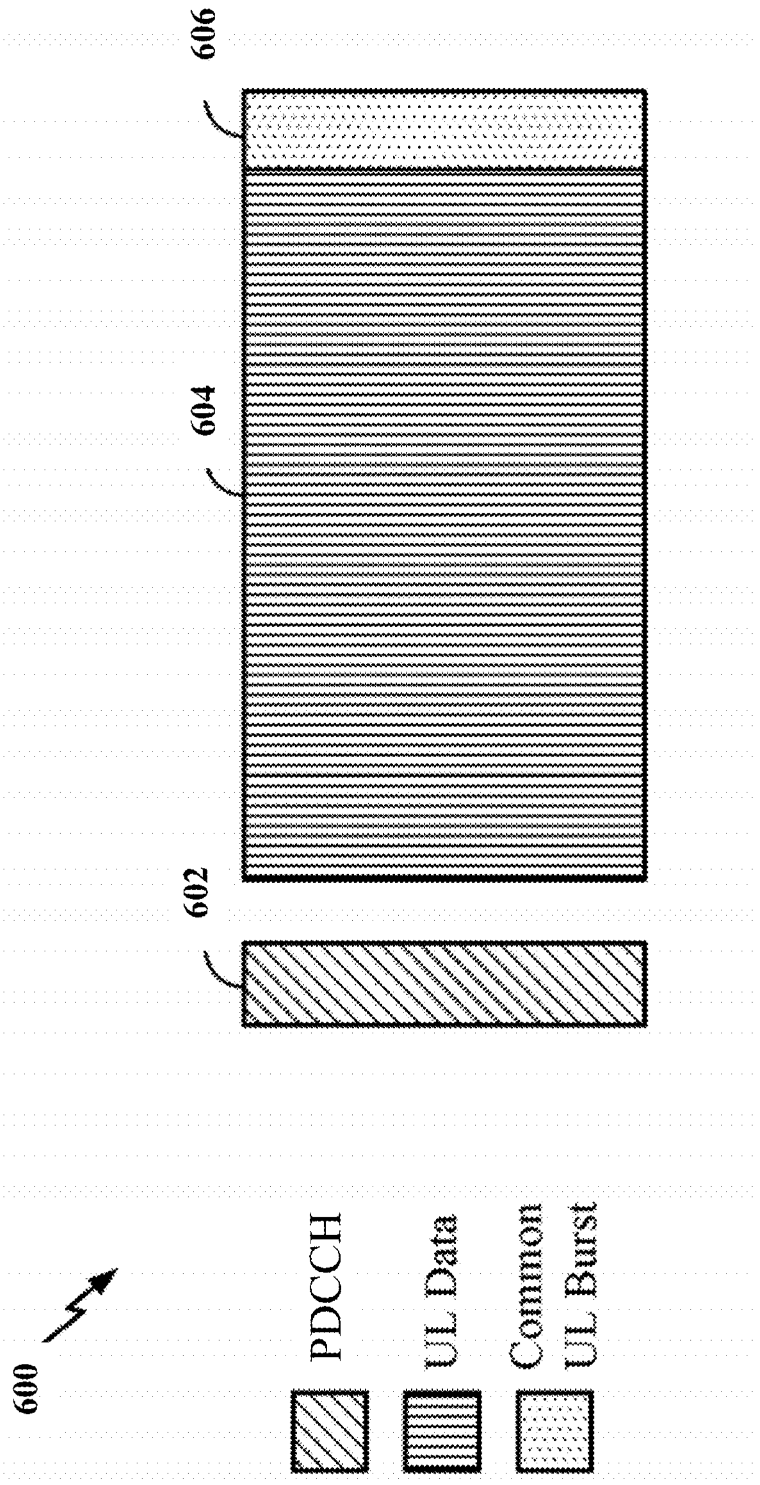
FIG. 6 is a diagram showing an example of an UL-centric subframe.

FIG. 6 is a diagram 600 showing an example of an UL-centric subframe. The UL-centric subframe may include a control portion 602. The control portion 602 may exist in the initial or beginning portion of the UL-centric subframe. The control portion 602 in FIG. 6 may be similar to the control portion 502 described above with reference to FIG. 5. The UL-centric subframe may also include an UL data portion 604. The UL data portion 604 may sometimes be referred to as the pay load of the UL-centric subframe. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 606. The common UL portion 606 in FIG. 6 may be similar to the common UL portion 606 described above with reference to FIG. 6. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such side link communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 7:
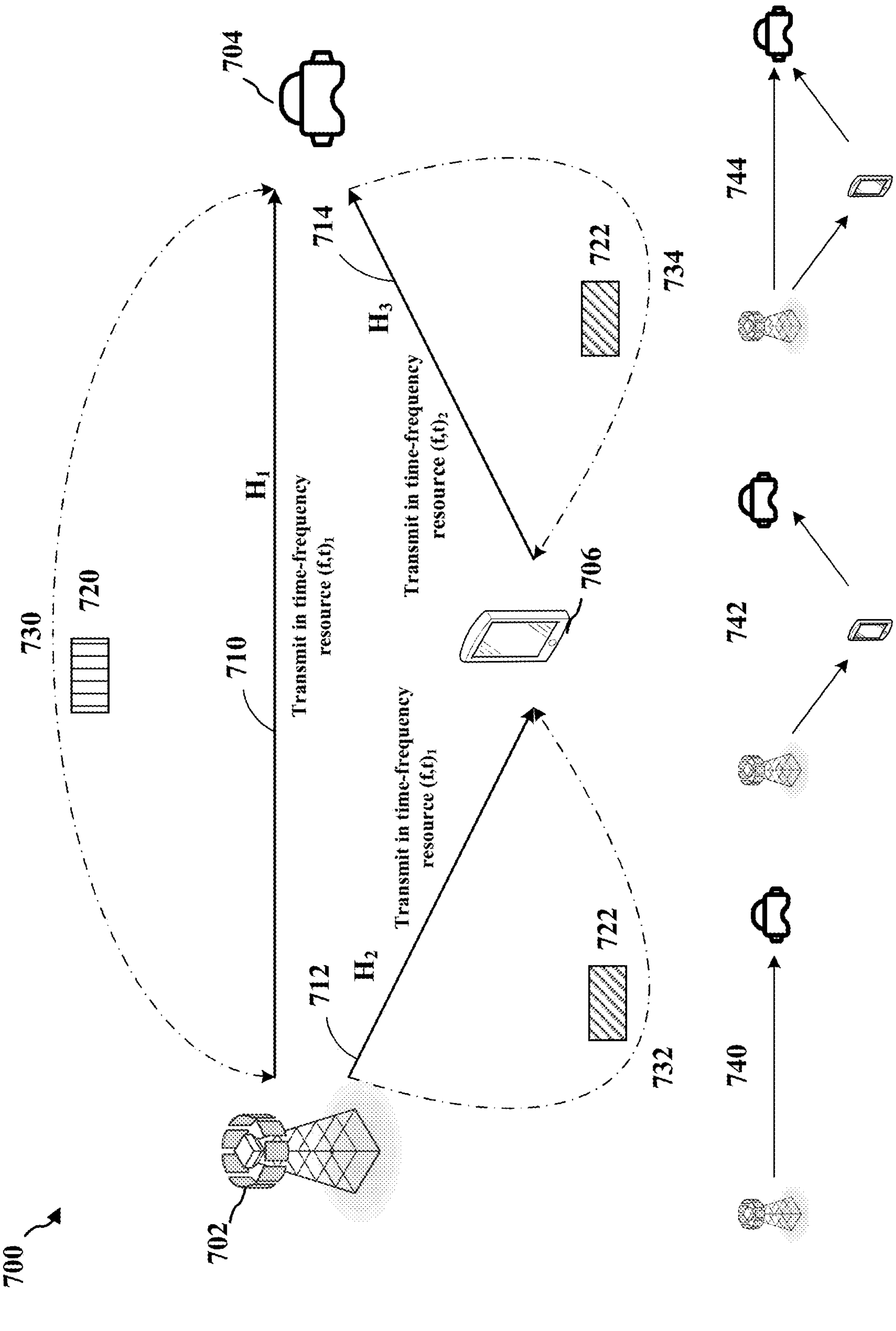
FIG. 7 is a diagram illustrating a device aggregation.

FIG. 7 is a diagram 700 illustrating a device aggregation. A base station 702 and a UE 704 communicate with each other via a repeater 706. The UE 704 may be a wearable device that has limited communication and processing capabilities. For example, wearable devices may not have space for large antennas or power amplifiers. The repeater can help amplify and re-transmit the signal using its less constrained form factor. The repeater 706 may be wireless devices such as mobile phone, fixed CPE, and wireless router. As described infra, the repeater 706 receives RF signals on a first frequency band $f_1$, shifts the RF carrier of the RF signals to a second frequency band $f_2$, and then transmits the shifted RF signals on the second frequency band $f_2$. Each frequency band is an interval in frequency domain. In particular, the repeater 706 may be a frequency translating repeater. The repeater 706 may also be a time delaying repeater, which receive RF signals and then re-transmit the received RF signals after some time delay. Further, the repeater 706 may receive RF signals in a first time-frequency resource, translate the received RF signals to a second time-frequency resource, and then transmit the translated RF signals. In particular, the first time-frequency resource may be orthogonal with the second time-frequency resource.

Using (f, t) to denote the time-frequency resources: $(f, t)_1$ denotes the time-frequency resource used by the base station 702 for transmitting and receiving RF signals. $(f, t)_2$ denotes the resources used by the repeater 706 to transmit RF signals to the UE 704. In certain configurations, $(f, t)_1$ and $(f, t)_2$ are orthogonal. In particular, they do not overlap in frequency domain. In certain configurations, $(f, t)_1$ may be the same as $(f, t)_2$. Further, $(f, t)_1$ and $(f, t)_2$ can be non-overlapped component carriers, non-overlapped bandwidth parts (BWPs), non-overlapped frequency bands, or non-overlapped collections within the same component carrier (CC).

In this example, the base station 702 transmits RF signals on the time-frequency resource $(f, t)_1$ (e.g., CC1). The UE 704 receives the RF signals from the base station 702 through a channel 710, which can be represented as $H_1$. The repeater 706 receives the RF signals from the base station 702 through a channel 712, which can be represented as $H_2$. The repeater 706 can amplify and forward the RF signals received. Further, the repeater 706 shifts or translates the frequency of the RF carrier to a time-frequency resource $(f, t)_2$ (e.g., CC2). The repeater 706 transmits RF signals on the time-frequency resource $(f, t)_2$. The UE 704 receives, on the time-frequency resource $(f, t)_2$, the RF signals transmitted at the repeater 706 through a channel 714, which can be represented as $H_3$.

The repeater 706 create an indirect data path to improve the data signal quality for the UE 704. In this setup, the base station 702 first transmits data to the repeater 706 on $(f, t)_1$. The repeater 706 then implements frequency translation: it forwards the received data from $(f, t)_1$ to $(f, t)_2$ and transmits the data to the UE 704 on $(f, t)_2$.

This additional indirect data path via the repeater 706 can boost the signal quality for the UE 704 through several techniques. Firstly, the repeater 706 can leverage advanced beamforming techniques on the multiple antennas it has to improve reception of the signal from the base station 702 on $(f, t)_1$. Secondly, the repeater 706 can adjust its transmission power to the UE 704 on $(f, t)_2$ based on path loss measurements to ensure an optimal signal level. Next, $(f, t)_2$ may have more favorable propagation conditions to the UE 704 compared to $(f, t)_1$ from the base station 702. Finally, the UE 704 can combine the signals received from both the direct path on $(f, t)_1$ and the indirect path on the $(f, t)_2$ to get diversity gain.

The repeater 706 and/or the UE 704 may receive control information via one or more control paths. In certain configurations, the base station 702 may send control information 720 to the UE 704 through a control path 730 and send control information 722 to the repeater 706 through a control path 732. In certain configurations, the repeater 706 may rely on the UE 704 to obtain the control information 722 through a control path 734.

The control information 720 and 722 contain configurations for the UE 704 and repeater 706 respectively. For the UE 704, the control information 720 configures reference signals in the second time-frequency resource $(f, t)_2$ that the UE 704 can measure. This allows the UE to estimate the channel conditions on the indirect path via the repeater. It also contains instructions to guide the UE's path selection between the direct and indirect paths.

For the repeater 706, the control information 722 includes parameters to control the repeater's behavior. This includes power control levels, beamforming configurations, enabling/disabling frequency translation etc. It provides the mapping rule to translate signals from $(f, t)_1$ to $(f, t)_2$. It also configures reference signals in $(f, t)_1$ that allow the repeater to estimate the channel between itself and the base station.

As such, the control information 720 and 722 include one or more of the below items:

1) Power control—Controlling the transmission power of the repeater when sending data to the UE (e.g. wearable).
2) Path combining/selection—Allowing the UE to either combine or select between the two data paths (direct and indirect through repeater).
3) Repeater beamforming—Configuring the receive and/or transmit beamforming of the repeater. This depends on the channel conditions.
4) Mode switching—Enabling or disabling the forwarding function of the repeater. If disabled, the repeater does not forward any data.
5) Resource allocation—Indicating the mapping of resources between the base-station-to-repeater link and repeater-to-UE link. For example, how the repeater maps data from one frequency band to another.
6) Reference signal configuration—Configuring special reference signals to allow devices to measure the channel conditions of the indirect path through the repeater. This can be different from legacy systems where normally only the direct base station to UE path is measured.

When the repeater 706 repeater does not have cellular connectivity, the control path 734 allows the UE 704 to directly control and configure the repeater 706. The UE 704 can leverage technologies like WiFi, Bluetooth or sidelink to send control information to the repeater such as beamforming configurations and resource allocation instructions. This control path is essential since the repeater may need to rely on the UE 704 for coordination given its lack of direct network access.

When the repeater 706 repeater has cellular connectivity, the control path 732 between the base station 702 and the repeater 706 uses the standard licensed cellular interface. Over this channel, the base station 702 can send important control information to the repeater around parameters like transmission power levels and beamforming coefficients. This allows the network to directly coordinate the repeater behavior as needed.

For example, the repeater 706 may be informed the reference signal configuration via the control path 732 or the control path 734, so that it can 1) measure channel quality between the base-station and the repeater, or 2) derive proper Rx and/or Tx beamforming for signal forwarding based on measurement on the reference signal.

The control path 730 between the base station 702 and the UE 704 may be a regular cellular control path using the standard Uu interface. On this path, the base station 702 can send control signaling to the UE 704 in aspects such as path selection and CSI configuration. The UE 704 may send, on the control path 730, information such as path selection outcomes and capability reports to the network.

In a first technique, the repeater 706 is capable of directly communicating with the base station 702. This technique utilizes a network-controlled flow for controlling the repeater 706's behavior. The repeater 706 and the UE 704 may report their capabilities to the base station 702. The base station 702 configures and transmits reference signals to allow the repeater 706 and the UE 704 to measure channel conditions. Based on the channel measurements, the base station 702 transmits control information to the repeater 706 and the UE 704 regarding parameters like transmission power, beamforming, frequency translation, etc. The base station 702 transmits data to the wearable 704, which may directly receive it or receive it via the repeater 706 depending on path selection.

In the network-controlled flow, the base station configures reference signals in $(f, t)_1$ and/or $(f, t)_2$ for the repeater and UE to measure the channel conditions. After receiving the reference signal measurements from the repeater and UE, the base station determines the control information 722 and 720 to control the transmission powers, beamforming configurations, frequency translation enabling/disabling, number of maximal allowable spatial layers for forwarding, and resource mapping in the repeater. The base station also indicates to the UE whether to receive data via the direct path, indirect path, or both paths combined.

In a second technique, the repeater 706 is not capable of directly communicating with the base station 702. This technique utilizes a UE-controlled flow for controlling the repeater 706's behavior. The UE 704 first sends a request signaling to the repeater 706 to ask the repeater 706 to transmit (forward) data in the second time-frequency resource $(f, t)_2$. After receiving the request from the UE 704, the repeater 706 sends a response back to the UE 704 to acknowledge the request for transmission in $(f, t)_2$.

The UE 704 then delivers control information to the repeater 706 for data transmission. The control information includes: transmission power indicator for the repeater 706 in $(f, t)_2$; Rx/Tx beamforming information for the repeater 706; number of maximal allowable spatial layers for forwarding for the repeater 706; Frequency-translation/mode-switching indicator for the repeater 706; and/or RS configuration or CSI report configuration.

The control information may be delivered via sidelink or WiFi between the UE 704 and repeater 706. After receiving the control information, the repeater 706 transmits data in the second time-frequency resource $(f, t)_2$. The repeater 706 may send the forwarded data in resources reserved by the UE 704 in $(f, t)_2$. To decide which path is better, the UE 704 and repeater 706 may exchange CSI measurement reports. For example, the repeater 706 sends its report to the UE 704, and the UE 704 decides whether frequency translation in the repeater 706 should be enabled.

In the UE-controlled flow, the repeater does not have cellular connectivity and cannot directly receive control information from the base station. The UE requests the repeater to forward data in $(f, t)_2$ and sends control information to the repeater regarding transmission power, beamforming, frequency translation enabling/disabling, and resource reservation in $(f, t)_2$. To allow the repeater to measure the channel conditions, the UE provides reference signal configurations to the repeater. The repeater can derive necessary information to facilitate its forwarding based on the measurement, e.g., beamforming parameters used for forwarding. The repeater can also report channel measurements to the UE to assist in determining whether to use the repeater's forwarding.

As described supra, there are three paths for data transmission from the base station 702 to the UE 704. The first one is a direct path 740. The data is transmitted from the base station 702 to the UE 704 directly in the first time-frequency resource $(f, t)_1$. The second one is an indirect path 742. The data is transmitted from the base station 702 to the repeater 706 in the first time-frequency resource $(f, t)_1$. The repeater 706 translates the received data to the second time-frequency resource $(f, t)_2$ and transmits the data to the UE 704 in $(f, t)_2$. The third one is a combination path 744. The same data is transmitted through the direct path 740 and the indirect path 742 to the UE 704. The signals from the two paths are combined in baseband by the UE 704 in analog domain before baseband processing (such as MIMO decoding).

Figure 8:
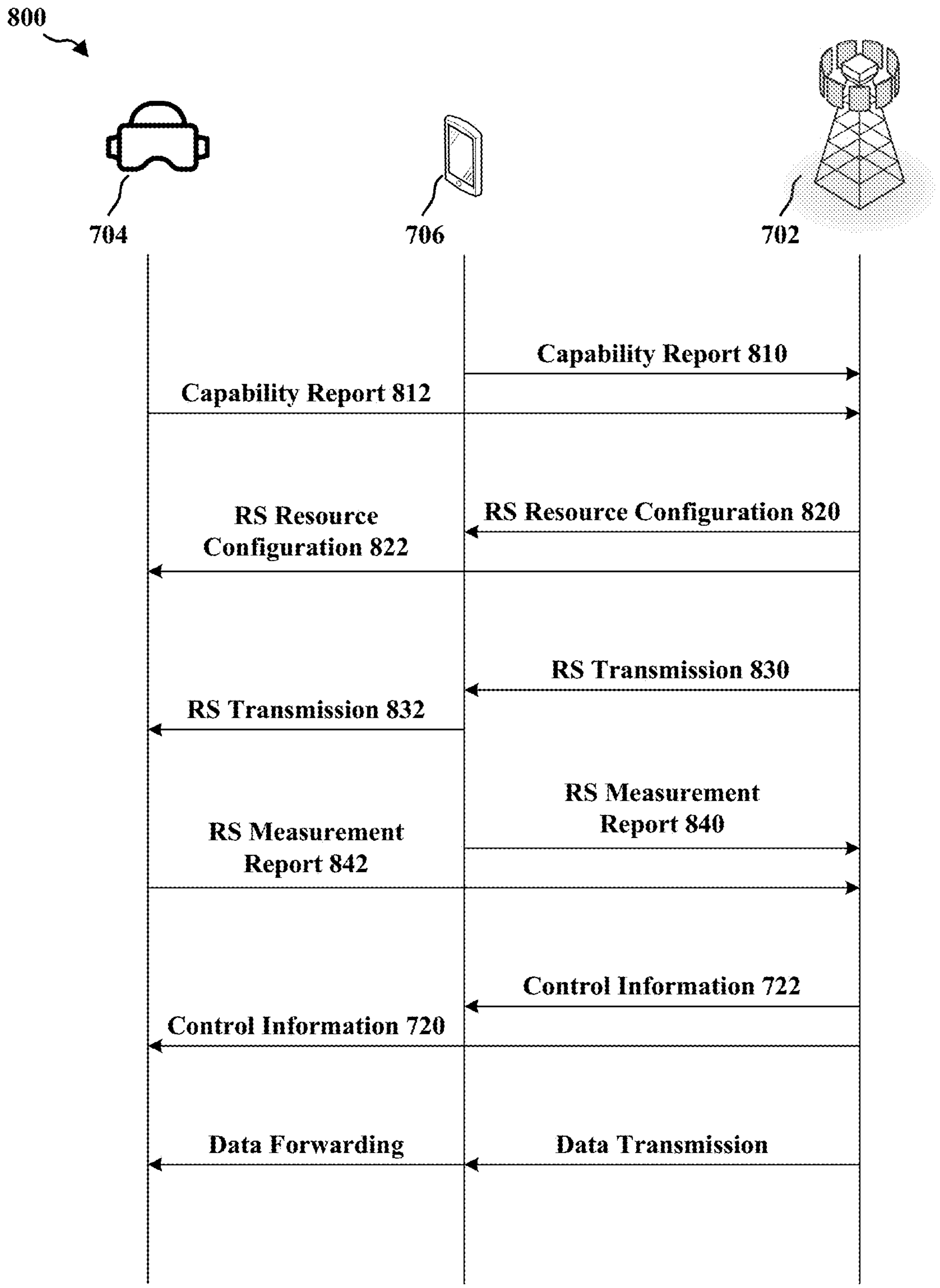
FIG. 8 is a diagram illustrating a network-controlled flow utilized under a first technique.

FIG. 8 is a diagram 800 illustrating the network-controlled flow utilized under the first technique. The repeater 706 sends the base station 702 a capability report 810 and reports its frequency translation capability, antenna capability and the supported translated frequency range(s) for the second time-frequency resource $(f, t)_2$. The frequency translation capability will specify whether the repeater 706 has the ability to perform frequency translation. Frequency translation refers to the ability to receive signals on one frequency $(f_1)$ and transmit them on a different frequency $(f_2)$.

The antenna capability may include details about the repeater 706's antenna system. This could involve the type of antennas being used, their characteristics (e.g., directional or omnidirectional), and how the antennas are configured. The antenna capability may include details such as the number of receive antennas and the number of transmit antennas (e.g., it has 4 receive antennas and 4 transmit antennas, or maybe 4 receive antennas but only 2 transmit antennas).

The antenna configuration of the repeater impacts how the repeater can shape and process the signals when receiving from the base station and forwarding to the UE. For example, more antennas allow the repeater to perform beamforming to optimize the signals. The base station can determine how best to utilize the repeater and configure the transmission and reception beamforming patterns appropriately.

The repeater 706 reports the frequency range (in this case, the translated frequency range) that it is capable of using for the second time-frequency resource $(f, t)_2$. This range is essential for coordination and ensuring that the base station 702 and repeater 706 are operating within compatible frequency bands.

The UE 704 sends the base station 702 a capability report 812 and reports its capability for path selection and supported frequency range(s) for the second time-frequency resource $(f, t)_2$. Path selection refers to the ability of the UE 704 to choose between different paths or routes for its communication with the base station 702. This might include the UE 704's ability to determine which relay or repeater node it should communicate with to optimize signal quality or other performance criteria. The UE 704 reports the range of frequencies it can operate on or communicate with. In this case, it's indicating its supported frequency range for the second time-frequency resource $(f, t)_2$. This information helps the base station 702 understand the frequencies at which the UE 704 can send and receive signals.

The base station 702 indicates reference signal (RS) resource configuration 820 to the repeater 706 for measurement in the first time-frequency resource $(f, t)_1$. This lets the repeater 706 measure the channel 712's conditions on the first time-frequency resource $(f, t)_1$. The measurement is used to determine Rx beamforming of the repeater 706. The RS resource configuration 820 may also inform the repeater 706 to generate RS and transmit the RS to the UE 704 in the second time-frequency resource $(f, t)_2$.

The base station 702 indicates, on $(f, t)_1$, reference signal (RS) resource configuration 822 to the UE 704 for measurement on the second time-frequency resource $(f, t)_2$. This lets the UE 704 measure the channel 714's conditions in the second time-frequency resource $(f, t)_2$. The base station 702 configures RS resource for the UE 704. The RS will be transmitted by the repeater 706 on the second time-frequency resource $(f, t)_2$. The measurement is used to determine transmit power in the second time-frequency resource $(f, t)_2$ or Tx beamforming of the repeater 706.

The base station 702 transmits RS 830 to the repeater 706 on the first time-frequency resource $(f, t)_1$. The repeater 706 measures the RS 830 according to the RS resource configuration 820 and generates RS measurement report 840. The repeater 706 transmits the RS measurement report 840 to the base station 702. This measurement may be used to determine receive beamforming parameters for the repeater 706. By analyzing the channel conditions from the base station 702 to the repeater 706, the optimal receive beamforming scheme (e.g. antenna selection, combining weights etc.) can be determined. This measurement procedure can leverage legacy NR specifications. The base station can configure CSI resources and request CSI reports from the repeater 706, since the repeater 706 is connected to the network. Therefore, the repeater 706 can measure RS, calculate CSI, and feed back reports to the base station 702 using existing NR signaling. The base station 702 can then determine suitable receive beamforming for the repeater 706 based on the CSI reports, or the repeater can determine suitable receive beamforming by itself based on the measurements of RS.

An example of SVD (Singular Value Decomposition) based beamforming is shown for the repeater 706. In this example, the gNB/repeater have 32/2 transmit antenna ports, and the repeater/UE have 4/2 receive antenna ports.

The channel matrix $H_1$ (2×32) represents the MIMO channel from gNB to UE directly. The channel matrix $H_2$ (4×32) represents the MIMO channel from gNB to the repeater; $H_2$ can be estimated by the repeater 706 if the repeater 706 can measure RS from the base-station 702. The channel matrix $H_3$ (2×2) represents the MIMO channel from repeater to UE.

SVD decomposition is performed on the matrix $$H_{eff} = H_2 H_2^H$$

as follows:

$$\begin{aligned} H_{eff} &= H_2 H_2^H \\ &= U \sum V \\ &= [\mu_1, \mu_2, \mu_3, \mu_4] \begin{bmatrix} \sigma_1 & 0 & 0 & 0 \\ 0 & \sigma_2 & 0 & 0 \\ 0 & 0 & \sigma_3 & 0 \\ 0 & 0 & 0 & \sigma_4 \end{bmatrix} [v_1, v_2, v_3, v_4] \end{aligned},$$

where U is a matrix with left singular vectors $\mu_1, \mu_2, \mu_3, \mu_4$; $\Sigma$ is a diagonal matrix with singular values $v_1, v_2, v_3, v_4$; V is a matrix with right singular vectors $\sigma_1, \sigma_2, \sigma_3, \sigma_4$ in descending order.

The beamforming matrix W is then formed by taking the first 2 columns of U, corresponding to the two largest singular values $\sigma_1$ and $\sigma_2$:

$$W = \begin{bmatrix} \mu_1^H \\ \mu_2^H \end{bmatrix},$$

where $$\mu_1^H$$

is Hermitian (conjugate) transpose of 1st column of U:

$$\mu_2^H$$

is Hermitian transpose of 2nd column of U. This W matrix applies the beamforming weights from the 4 repeater receive antennas to the 2 transmit antennas. By taking the conjugate transpose of $\mu_1$ and $\mu_2$, the highest gain transmit directions are selected to maximize performance. In this example the repeater takes two column vectors for Rx and Tx beamforming, W, because the indirect path can at most contribute two spatial layers for data forwarding. As another example, the column vectors can be two identical vectors if the base-station is sure that the data signal to be forwarded is rank-1:

$$W = \begin{bmatrix} \mu_1^H \\ \mu_1^H \end{bmatrix}.$$

Thus, the repeater may also need information of maximal number of allowable spatial layers to be forwarded in order to decide Rx and Tx beamforming properly. Equivalently, the maximal number of allowable spatial layers is maximal rank of the beamforming matrix W. Then the base-station 702 or the UE 704 may need to signal to the repeater a maximal number of allowable spatial layers for forwarding.

The repeater 706 generates RS 832 according to the RS resource configuration 820 and transmits the RS 832 to the UE 704 in the second time-frequency resource $(f, t)_2$. The UE 704 measures the RS 832 according to the RS resource configuration 822 and generates RS measurement report 842. The UE 704 transmits the RS measurement report 842 to the base station 702. This measurement may be used to determine the transmit power of the repeater 706 on $(f, t)_2$. By measuring the channel conditions from the repeater 706, the UE 704 can determine an appropriate transmit power for the repeater 706 on $(f, t)_2$. This measurement may be used to determine Tx beamforming of the repeater 706. By analyzing the channel conditions, the UE 704 can determine optimal beamforming parameters (e.g. antenna selection, precoding matrix etc.) for the repeater 706's transmission on $(f, t)_2$.

According to the received RS measurement report 840 (for segment from the base station 702 to the repeater 706) and RS measurement report 842 (for segment from the repeater 706 to the UE 704), the base station 702 may estimate the end-to-end quality from the base station 702 to the UE 704 through the indirect path. The UE 704 may measure reference signals from the base station 702 on $(f, t)_1$ to get the direct path quality rely on normal CSI feedback that the UE 704 sends to the base station 702.

By comparing the channel quality of the direct path and the indirect path, the base station 702 may select a path and informs the path selection to the UE 704 by transmitting the control information 720.

In this first technique implementing the network-controlled flow, the base station 702 transmits control information 722 to the repeater 706. This control information contains parameters to control the behavior of the repeater 706 when it receives signals on the first time-frequency resource $(f, t)_1$ and forwards them to the second time-frequency resource $(f, t)_2$ for transmission to the UE 704. As discussed, the repeater 706 assists in communication between the base station 702 and the UE 704 by receiving signals on $(f, t)_1$ and forwarding them on $(f, t)_2$ after frequency translatings.

The control information 722 from the base station 702 to the repeater 706 includes one or more of the following:

Transmission power control information—This controls the transmission power of the repeater 706 when sending data to the UE 704 on $(f, t)_2$. For example, the base station 702 can specify an exact power value, a maximum transmission power, or a relative increase/decrease.

Beamforming information—The base station 702 can configure the receive and/or transmit beamforming of the repeater 706 based on channel conditions. This could be weighting each antenna or simpler antenna selection.

Frequency translation enabling/disabling—The base station 702 can enable or disable the frequency translation function of the repeater 706. For example, enabling it allows forwarding from $(f, t)_1$ to $(f, t)_2$. Disabling would stop forwarding.

Number of maximal allowable spatial layers for forwarding—The base station 702 can provide this number for ease of determining Rx and Tx beamforming for data forwarding on the repeater 706.

Resource mapping—The base station 702 provides the mapping of how resources are translated from $(f, t)_1$ to $(f, t)_2$. This allows proper forwarding by the repeater 706. More specifically, resource mapping rule from the first time-frequency resource $(f, t)_1$ to the second time-frequency resource $(f, t)_2$ specifies how resources, such as subcarriers, time slots, or frequency bands, in the first time-frequency resource $(f, t)_1$ are mapped to the corresponding resources in the second time-frequency resource $(f, t)_2$.

In addition, the base station 702 sends control information 720 to the UE 704. This includes:

Path selection/combining indication—The base station 702 tells the UE 704 whether to receive data directly from $(f, t)_1$, indirectly via the repeater 706 from $(f, t)_2$, or both. This impacts how the UE 704 calculates its CSI.

CSI configuration—The base station 702 provides CSI assumptions to the UE 704 based on the selected path. For example, if the indirect path is chosen, the UE should measure CSI on $(f, t)_2$.

After transmitting the control information, the base station 702 sends its data transmission intended for the UE 704 on $(f, t)_1$. The UE 704 then receives the data either directly on $(f, t)_1$ or indirectly forwarded by the repeater 706 on $(f, t)_2$, depending on path selection.

In this example, the indirect path 742 is selected. The base station 702 transmits reference signals on $(f, t)_1$. The repeater 706 then forwards the reference signals from $(f, t)_1$ to $(f, t)_2$ through frequency translating. After the reference signals are forwarded to the $(f, t)_2$, the repeater 706 transmits the reference signals to the UE 704. The UE 704 then reports the reference signal measurements to the base station 702 corresponding to the signals received on $(f, t)_2$.

At this point, the base station 702 needs an end-to-end CSI report since the path has already been selected. The CSI report should reflect the actual selected path, either direct or indirect. For example, if the direct link was selected, the UE 704 should measure reference signals on $(f, t)_1$. But if the indirect link was selected, the UE 704 should measure on $(f, t)_2$ to provide an end-to-end CSI covering the path through the repeater 706. This allows the base station 702 to get channel state information reflecting the full selected path.

Figure 9:
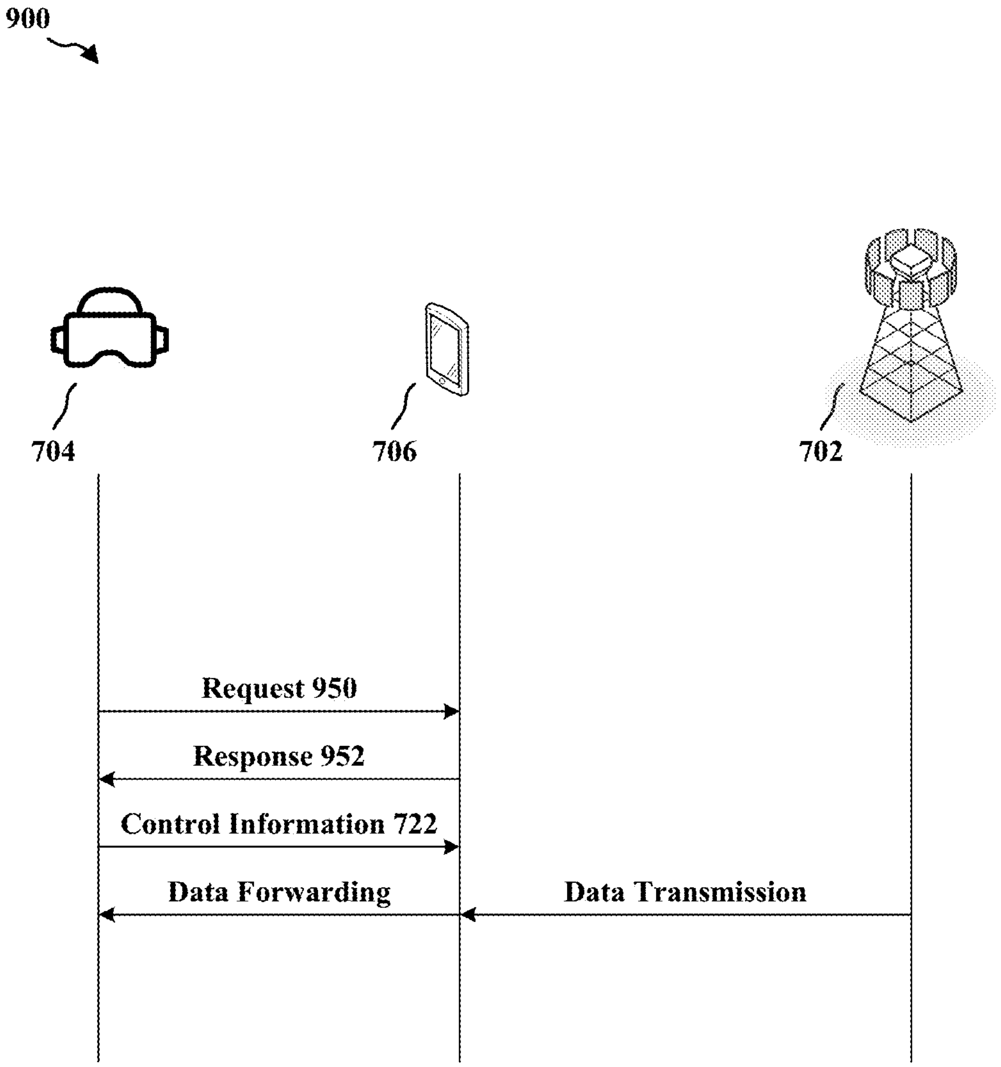
FIG. 9 is a diagram illustrating a UE-controlled flow utilized under a second technique.

FIG. 9 is a diagram 900 illustrating the UE-controlled flow utilized under the second technique. In the UE-controlled flow, the repeater 706 is not capable of directly communicating with the base station 702. The repeater 706 may rely on the UE 704 to obtain the necessary control information in this case.

The UE 704 first sends a request 950 the repeater 706 to ask the repeater 706 to transmit (forward) data in the second time-frequency resource $(f, t)_2$. After receiving the request from the UE 704, the repeater 706 sends a response 952 back to the UE 704 to acknowledge the request for transmission in $(f, t)_2$.

The UE 704 may reserve resources for the repeater 706 to transmit data or reference signals in the second time-frequency resource $(f, t)_2$.

If $(f, t)_2$ is in the unlicensed band, then the UE 704 may need to explicitly reserve resources before the repeater 706 can transmit. This is because in the unlicensed band, the channel is shared and the repeater cannot freely transmit without risk of collision.

By reserving certain resources in $(f, t)_2$ ahead of time, the UE 704 ensures there will be allocated slots that the repeater 706 can transmit in without interference from other devices. This reservation step may be unnecessary if $(f, t)_2$ is in the licensed band, since transmissions are better coordinated.

Overall, this allows the UE 704 to grant transmission opportunities to the repeater 706 in the second time-frequency resource $(f, t)_2$. This is important to enable the repeater to forward data and reference signals back to the UE as part of the UE-controlled flow procedure.

In the licensed band, the UE 704 can reserve, with the base station 702, certain time-frequency resources in $(f, t)_2$ for the repeater 706 to transmit data or RS to the UE 704. This reservation gives allocated resources for the repeater 706 to transmit in without collisions. However, if $(f, t)_2$ is in the unlicensed band, reservation may not be needed. In the unlicensed band, devices can transmit whenever the channel is free.

The UE 704 then sends control information 722 to the repeater 706 for data transmission. In certain configurations, some or all of the control information 722 may be generated at the base station 702 and sent to the UE 704. The rest of the control information 722 may be determined by the UE 704. The control information 722 includes at least one of the following items:

- Transmission power indicator for the repeater 706 in $(f, t)_2$. The transmission power indicator is control information sent from the UE 704 to the repeater 706 to indicate the transmission power level that the repeater 706 should use when forwarding data in the second time-frequency resource $(f, t)_2$. Since the repeater 706 does not have direct network access, it relies on the UE 704 to provide power control information. The UE 704 determines the optimal power level based on measurements and channel conditions and informs the repeater 706 accordingly via the transmission power indicator. This allows the UE 704 to control the repeater's transmission power when sending data to the UE 704 in $(f, t)_2$. The indicator could specify an exact power value or relative increase/decrease compared to the current power. Enabling power control by the UE 704 helps ensure an appropriate signal level is maintained for the repeater-to-UE link.
- Rx/Tx beamforming information for the repeater 706. The Rx/Tx beamforming information refers to configurations provided by the UE 704 to control the receive and transmit beamforming capabilities of the repeater 706. Since the repeater 706 has multiple antennas for reception and transmission, beamforming allows it to optimize the signal when receiving data from the base station 702 in $(f, t)_1$ and forwarding it to the UE 704 in $(f, t)_2$. The Rx beamforming information configures how the repeater 706 should combine and weight the signals received on its multiple receive antennas. This impacts the quality of signals received from the base station 702. The Tx beamforming information configures how the repeater 706 should distribute and weight the signals across its multiple transmit antennas. This impacts the quality of signals transmitted to the UE 704. By controlling the repeater's beamforming, the UE 704 can optimize the overall signal quality across the indirect path going through the repeater 706. The beamforming information may include antenna selection schemes or more advanced weighting parameters.
- Frequency-translation/mode-switching indicator for the repeater 706. The frequency-translation/mode-switching indicator is control information from the UE 704 that configures the forwarding behavior of the repeater 706. Specifically, it controls whether the repeater 706 should: 1) Perform no forwarding at all 2) Forward with frequency-translation—receive data from the base station 702 in $(f, t)_1$, frequency translate it to $(f, t)_2$, and transmit to the UE 704 in $(f, t)_2$ 3) Forward without frequency-translation—receive data from the base station 702 in $(f, t)_1$ and repeat/retransmit it in the same $(f, t)_1$ resource to the UE 704. Based on channel conditions and other factors, the UE 704 can enable/disable frequency translation or select between the three forwarding modes using this indicator. This allows the UE 704 to control how the repeater 706 processes and forwards the data received from the base station 702 in order to optimize the overall signal quality.
- RS configuration or CSI report configuration. The RS configuration or CSI report configuration refers to reference signal or channel state information configurations that the UE 704 provides to the repeater 706. Since the repeater 706 does not have direct network access, it cannot receive reference signal configurations from the base station 702 directly. Therefore, the UE 704 supplies this information to allow the repeater 706 to make necessary measurements. Specifically, the RS configuration indicates the reference signals that the repeater 706 should measure, such as their resource mapping, sequence information, etc. This allows the repeater to estimate channel conditions, which can help determine optimal transmission power, beamforming, and forwarding decisions. As an example, the repeater measures the reference signals transmitted from the base station to estimate the channel between the basestation and the repeater. Based on the estimated channel, the repeater can determine the linear transformation from its received signal to its transmitting signal. The linear transformation is equivalent to Rx beamforming and Tx beamforming for forwarding on the repeater. Similarly, the CSI report configuration provides details on how the repeater 706 should calculate and format CSI reports to send back to the UE 704. This gives the UE 704 visibility into the channel quality of the repeater-UE link in $(f, t)_2$ to assist in path selection decisions. By configuring the reference signals and CSI reporting for the repeater 706, the UE 704 enables closed-loop optimization of the repeater path in the UE-controlled flow.

Since the repeater 706 does not have cellular connectivity in the UE-controlled flow, it cannot directly receive control information from the base station 702. The UE 704 provides sufficient RS and CSI configurations to the repeater 706. The control information may be delivered via sidelink or WiFi between the UE 704 and the repeater 706.

After receiving the control information, the repeater 706 transmits data in the second time-frequency resource $(f, t)_2$. The repeater 706 sends the forwarded data in resources reserved by the UE 704 in $(f, t)_2$.

To decide the better path quality for path selection, the UE 704 and the repeater 706 may exchange CSI reports with each other. For example, the repeater 706 sends its report to the UE 704, and the UE 704 decides whether frequency translation in the repeater 706 should be enabled.

Figure 10:
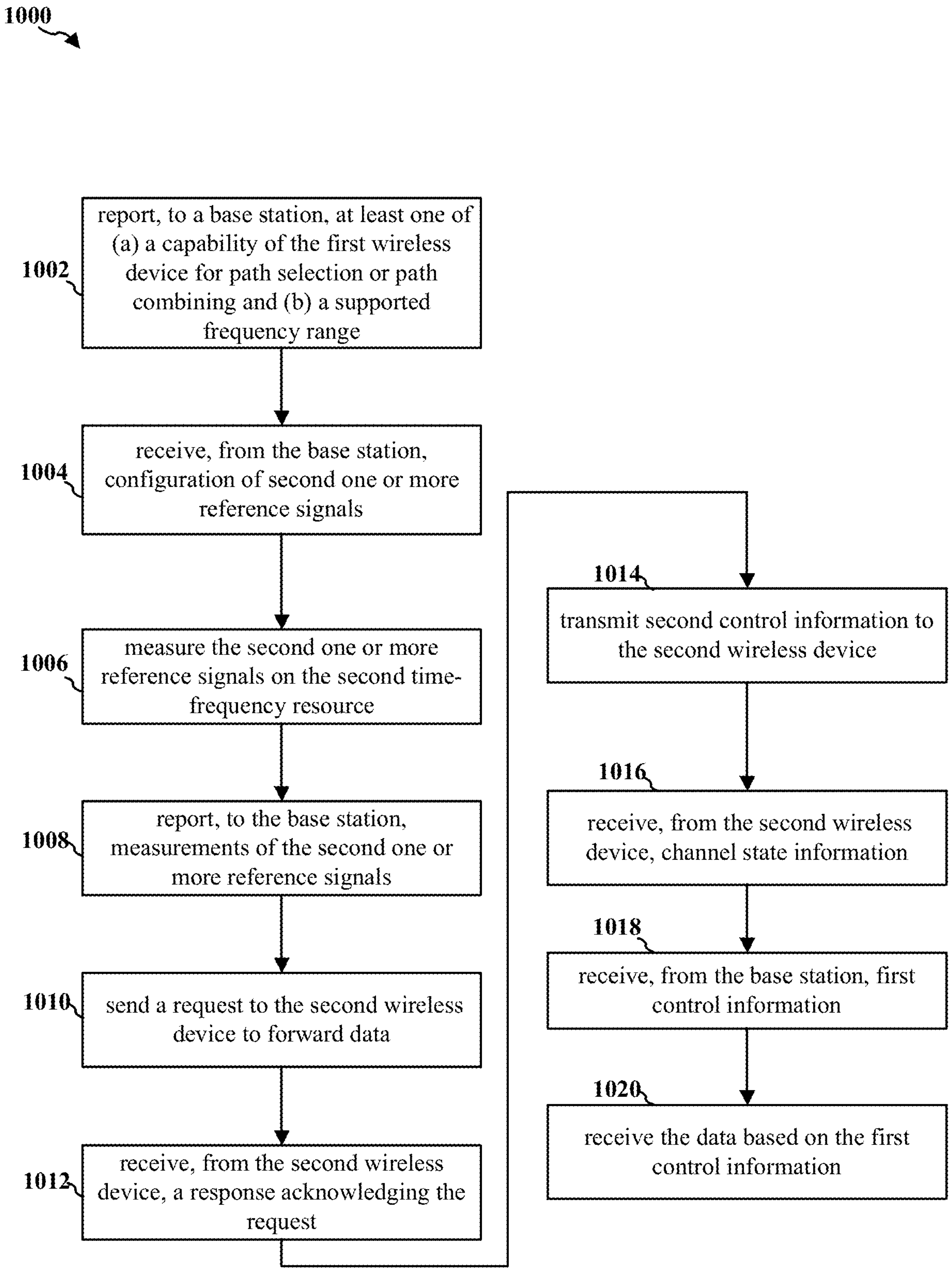
FIG. 10 is a flow chart of a method (process) for selecting a path for receiving data.

FIG. 10 is a flow chart 1000 of a method (process) for selecting a path for receiving data. The method may be performed by a first wireless device (e.g., the UE 704, the UE 250). In operation 1002, the first wireless device reports, to a base station, at least one of (a) a capability of the first wireless device for path selection or path combining, and (b) a supported frequency range on a second time-frequency resource. The path selection capability requires the first wireless device to receive data either on a first time-frequency resource from the base station or on the second time-frequency resource from a second device. The path combining capability requires the first wireless device to receive data on both the first and second time-frequency resources.

In operation 1004, the first wireless device receives, from the base station, configuration of second one or more reference signals to be transmitted on the second time-frequency resource by the second wireless device. In operation 1006, the first wireless device measures the second one or more reference signals on the second time-frequency resource transmitted from the second device. In operation 1008, the first wireless device reports, to the base station, measurements of the second one or more reference signals received on the second time-frequency resource.

In operation 1010, the first wireless device sends a request to the second wireless device to forward data to the first wireless device on the second time-frequency resource. In operation 1012, the first wireless device receives, from the second wireless device, a response acknowledging the request.

In operation 1014, the first wireless device transmits second control information to the second wireless device. The second control information includes at least one of: a transmission power indicator; receive and/or transmit beamforming parameters; a frequency translation enabling/disabling indicator; resource allocation of the second time-frequency resource; number of maximal allowable spatial layers for forwarding; resource mapping information between the first time-frequency resource and the second time-frequency resource; CSI report configuration information: and reference signal configuration information. In certain configurations, the second control information is transmitted via sidelink, Bluetooth, or WiFi.

In operation 1016, the first wireless device receives, from the second wireless device, channel state information for a channel between the base station and the second wireless device on the first time-frequency resource. The first wireless device may also receive, from the second wireless device, channel state information for a channel between the first wireless device and the second wireless device on the second time-frequency. resource.

In operation 1018, the first wireless device receives, from the base station, first control information indicating whether the first wireless device should receive data on the first time-frequency resource from the base station, on the second time-frequency resource from the second device, or on both the first and second time-frequency resources. The data is transmitted from the base station on the first time-frequency resource. In certain configurations, the first control information further indicates a channel state information (CSI) assumption that indicates the first wireless device should calculate CSI based on measurements on at least one of the first time-frequency resource and the second time-frequency resource. In operation 1020, the first wireless device receives the data based on the first control information.

Figure 11:
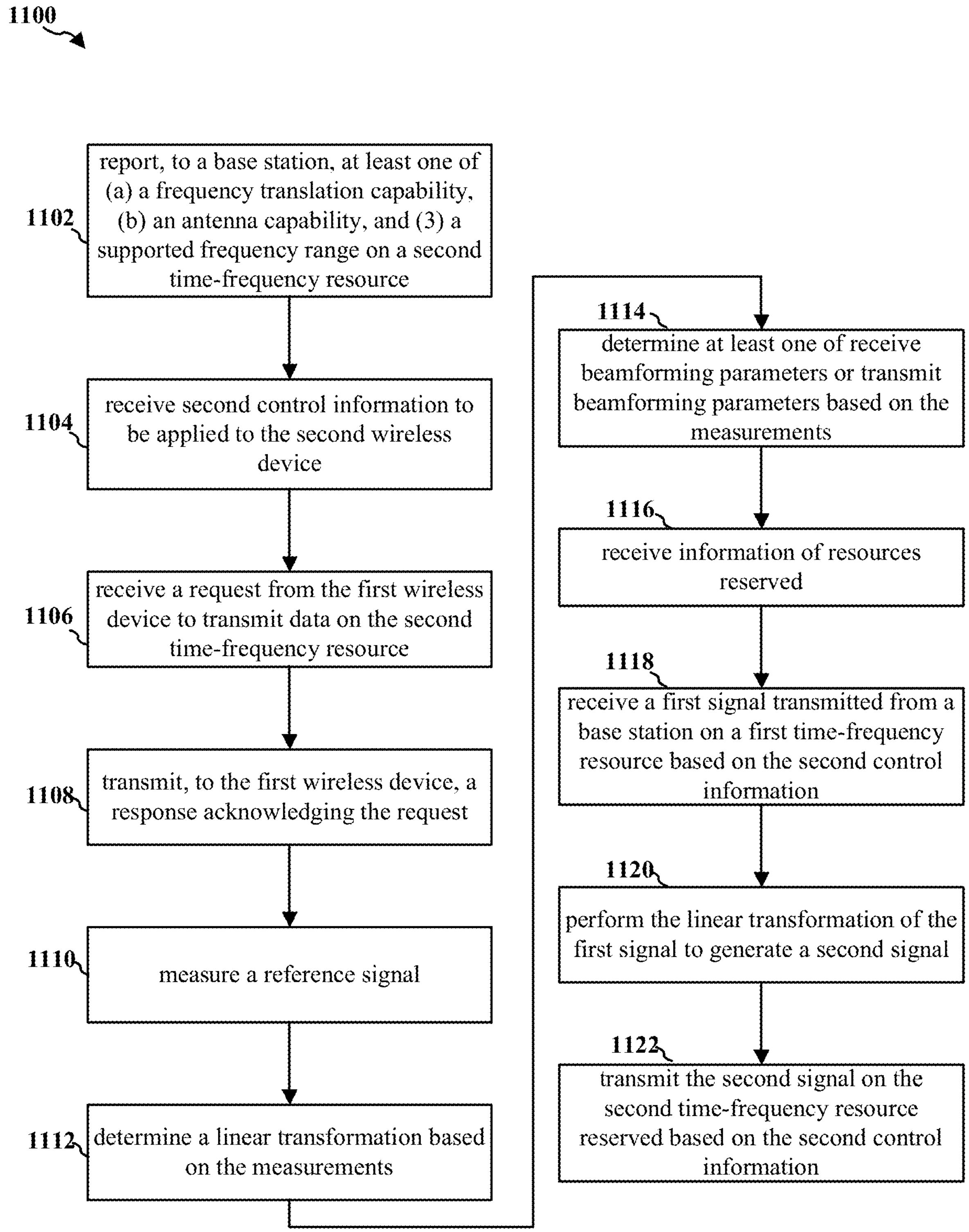
FIG. 11 is a flow chart of a method (process) for forwarding signals.

FIG. 11 is a flow chart 1100 of a method (process) for forwarding signals. The method may be performed by a second wireless device (e.g., the repeater 706, the UE 250). In certain configurations, in operation 1102, the second wireless device reports, to a base station, at least one of (a) a frequency translation capability. (b) an antenna capability, and (3) a supported frequency range on a second time-frequency resource.

In operation 1104, the second wireless device receives second control information to be applied to the second wireless device. The second control information includes at least one of: power control information; transmit and/or receive beamforming information; frequency translation enabling/disabling indicator; number of maximal allowable spatial layers for forwarding; resource mapping information for the mapping between the first time-frequency resource and the second time-frequency resource; and reference signal configuration information. In certain configurations, the second control information is received from the base station or from a first wireless device. In certain configurations, the second wireless device communicates with the first wireless device via sidelink, Bluetooth, or WiFi.

In certain configurations, in operation 1106, the second wireless device receives a request from the first wireless device to transmit data on the second time-frequency resource. In operation 1108, the second wireless device transmits, to the first wireless device, a response acknowledging the request.

In certain configurations, in operation 1110, the second wireless device measures a reference signal transmitted from the base station or the first wireless device according to the second control information including the reference signal configuration information. In operation 1112, the second wireless device determines a linear transformation based on the measurements. In operation 1114, the second wireless device determines at least one of receive beamforming parameters or transmit beamforming parameters based on the measurements.

In certain configurations, in operation 1116, the second wireless device receives information of resources reserved by the first wireless device or the base-station on the second time-frequency resource for the second wireless device. In operation 1118, the second wireless device receives a first signal transmitted from a base station on a first time-frequency resource based on the second control information. In operation 1120, the second wireless device performs the linear transformation of the first signal to generate a second signal. In operation 1122, the second wireless device transmits the second signal on the second time-frequency resource reserved based on the second control information.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a first wireless device, comprising:

receiving, from a base station, a reference signal (RS) resource configuration for measurement on a second time-frequency resource, wherein the RS resource configuration indicates RS to be transmitted by a second device on the second time-frequency resource, and wherein the second device is a repeater that receives data transmitted from the base station on a first time-frequency resource and translates the received data to the second time-frequency resource for forwarding to the first wireless device;

measuring the RS on the second time-frequency resource transmitted from the second device according to the RS resource configuration;

reporting, to the base station, at least one of (a) a capability of the first wireless device for path selection or path combining and (b) a supported frequency range on the second time-frequency resource, wherein the capability of the path selection requires that the first wireless device receive data either on the first time-frequency resource from the base station or on the second time-frequency resource from the second device, and wherein the capability of the path combining requires that the first wireless device receive data on both the first and second time-frequency resources;

receiving, from the base station, first control information indicating whether the first wireless device should receive data on the first time-frequency resource from the base station, on the second time-frequency resource from the second device, or both the first and second time-frequency resources, wherein the data are transmitted from the base station on the first time-frequency resource; and receiving the data based on the first control information.

2. The method of claim 1, further comprising:

receiving, from the base station, configuration of second one or more reference signals to be transmitted on the second time-frequency resource by the second wireless device;

measuring the second one or more reference signals on the second time-frequency resource transmitted from the second device;

reporting, to the base station, measurements of the second one or more reference signals received on the second time-frequency resource.

3. The method of claim 1, wherein the first control information further indicates a channel state information (CSI) assumption that indicates that the first wireless device should calculate CSI based on measurements on at least one of the first time-frequency resource and the second first time-frequency resource.

4. The method of claim 1, further comprising:

sending a request to the second wireless device to forward data to the first wireless device on the second time-frequency resource; and receiving, from the second wireless device, a response acknowledging the request.

5. The method of claim 4, further comprising:

transmitting second control information to the second wireless device, wherein the second control information includes at least one of:

a transmission power indicator;

receive and/or transmit beamforming parameters;

a frequency translation enabling/disabling indicator;

resource allocation of the second time-frequency resource;

number of maximal allowable spatial layers for forwarding;

resource mapping information between the first time-frequency resource and the second time-frequency resource;

CSI report configuration information; and reference signal configuration information.

6. The method of claim 4, wherein the second control information is transmitted via sidelink, Bluetooth, or WiFi.

7. The method of claim 4, further comprising:

receiving, from the second wireless device, channel state information for a channel between the base station and the second wireless device on the first time-frequency resource.

8. The method of claim 4, further comprising:

receiving, from the second wireless device, channel state information for a channel between the first wireless device and the second wireless device on the second time-frequency resource.

9. A method of wireless communication of a second wireless device, the second wireless device being a repeater that receives data transmitted from a base station on a first time-frequency resource and translates the received data to a second time-frequency resource for forwarding to a first wireless device, comprising:

receiving second control information to be applied to the second wireless device, wherein the second control information includes at least one of:

power control information;

transmit and/or receive beamforming information;

frequency translation enabling/disabling indicator, the frequency translation enabling/disabling indicator controlling switching among at least two modes including no forwarding and forwarding with frequency translation from the first time-frequency resource to the second time-frequency resource;

resource mapping information for the mapping between the first time-frequency resource and the second time-frequency resource;

number of maximal allowable spatial layers for forwarding; and reference signal configuration information;

receiving a first signal transmitted from the base station on the first time-frequency resource based on the second control information; and performing a linear transformation of the first signal to generate a second signal, wherein the linear transformation is determined based on measurement of a reference signal according to the reference signal configuration information, and is equivalent to receive beamforming and transmit beamforming for forwarding on the second wireless device; and transmitting the second signal on the second time-frequency resource based on the second control information.

10. The method of claim 9, further comprising:

measuring a reference signal transmitted from the base station or the first wireless device according to the second control information including the reference signal configuration information; and determining the linear transformation based on the measurements.

11. The method of claim 9, further comprising:

measuring a reference signal transmitted from the base station or the first wireless device according to the second control information including the reference signal configuration information; and determining at least one of receive beamforming parameters or transmit beamforming parameters based on the measurements.

12. The method of claim 9, further comprising:

reporting, to a base station, at least one of (a) a frequency translation capability, (b) an antenna capability, and (3) a supported frequency range on a second time-frequency resource.

13. The method of claim 9, wherein the second control information is received from the base station or from the first wireless device.

14. The method of claim 9, wherein the second wireless device communicates with the first wireless device via sidelink, Bluetooth, or WiFi.

15. The method of claim 9, further comprising:

receiving a request from the first wireless device to transmit data on the second time-frequency resource;

and transmitting, to the first wireless device, a response acknowledging the request.

16. The method of claim 9, further comprising:

receiving information of resources reserved by the first wireless device or the base-station on the second time-frequency resource for the second wireless device, wherein the second signal is transmitted on resources reserved.

17. An apparatus for wireless communication, the apparatus being a first wireless device, comprising:

a memory; and at least one processor coupled to the memory and configured to:

receive, from a base station, a reference signal (RS) resource configuration for measurement on a second time-frequency resource, wherein the RS resource configuration indicates RS to be transmitted by a second device on the second time-frequency resource, and wherein the second device is a repeater that receives data transmitted from the base station on a first time-frequency resource and translates the received data to the second time-frequency resource for forwarding to the apparatus;

measure the RS on the second time-frequency resource transmitted from the second device according to the RS resource configuration;

report to the base station, at least one of (a) a capability of the apparatus for path selection or path combining and (b) a supported frequency range on the second time-frequency resource, wherein the capability of the path selection requires that the first wireless device receive data either on the first time-frequency resource from the base station or on the second time-frequency resource from the second device, and wherein the capability of the path combining requires that the first wireless device receive data on both the first and second time-frequency resources;

receive, from the base station, first control information indicating whether the apparatus should receive data on the first time-frequency resource from the base station, on the second time-frequency resource from the second device, or both the first and second time-frequency resources, wherein the data are transmitted from the base station on the first time-frequency resource; and receive the data based on the first control information.

18. The apparatus of claim 17, wherein the at least one processor is further configured to:

receive, from the base station, configuration of second one or more reference signals to be transmitted on the second time-frequency resource by the second wireless device;

measure the second one or more reference signals on the second time-frequency resource transmitted from the second device;

report, to the base station, measurements of the second one or more reference signals received on the second time-frequency resource.

19. The apparatus of claim 17, wherein the first control information further indicates a channel state information (CSI) assumption that indicates that the apparatus should calculate CSI based on measurements on at least one of the first time-frequency resource and the second first time-frequency resource.

20. The apparatus of claim 17, wherein the at least one processor is further configured to:

send a request to the second wireless device to forward data to the apparatus on the second time-frequency resource; and receive, from the second wireless device, a response acknowledging the request.

* * * * *